INVENTOR.
A.J. RABINOWITZ
BY
ATTORNEY

United States Patent Office 3,437,739
Patented Apr. 8, 1969

3,437,739
MI CABLE TERMINAL CONNECTION
Azriel Jay Rabinowitz, Rochester, N.Y., assignor to Burndy Corporation, a corporation of New York
Filed June 28, 1967, Ser. No. 649,524
Int. Cl. H02g 3/18
U.S. Cl. 174—65    3 Claims

ABSTRACT OF THE DISCLOSURE

A terminal connection between a mineral-insulated electrical cable and a junction box having a threaded outlet with a shoulder at the base of the threads. A compression member having threads to engage the junction box also engages a cable sleeve fixed to the sheath of the cable and compresses a bushing positioned between the cable sleeve and the shoulder of the outlet to seal the junction box to the cable.

---

This invention relates to a terminal connection for an electrical cable of the mineral-insulated type, and more particularly, to a sealed connection between a cable and a junction box, which is capable of meeting hazardous duty requirements.

Mineral-insulated cable, also known as MI cable, denotes a type of electrical conductor cable comprising one or more high resistance conductors suitably spaced apart and surrounded by an electrically inert refractory mineral substance, such as powdered magnesium oxide, all of which is enclosed within a tubular outer metal sheath. Cable of this type finds particularly advantageous use in resistance-heating applications.

In view of these qualities of MI cable as compared to other electrical cables, it is used under adverse and hazardous conditions and especially where moisture or chemical vapors are present and high temperature changes are anticipated. Many of the advantages of MI cable may be lost, however, if the connection between the cable and a junction box or other type of housing is not resistant to moisture, vapor or temperature changes as is the cable itself. Therefore, it is necessary that any connection be sealed tightly, to prevent moisture or chemical vapors from entering the interior of the junction box, the mineral insulation, and the conductors, and yet the connection must have flexibility to accommodate temperature changes.

Accordingly, it is an object of the present invention to provide an MI cable junction box connection that is gas tight and suitable for hazardous duty applications.

Another object is to provide a connection for MI cable which will seal out fluids, vapor and gases from the mineral insulation and conductors and which will also be flexible enough to maintain its seal through wide temperature variations.

Still another object is to provide an MI cable connection that may be easily tightened; that will accommodate any loosening movement due to high temperature changes; and that is reuseable, inexpensive to manufacture, and simple to install with readily available tools.

These and other objects, features and advantages of this invention will be made more apparent by the following specification when taken in conjunction with the accompanying drawings, in which.

Figure 1:
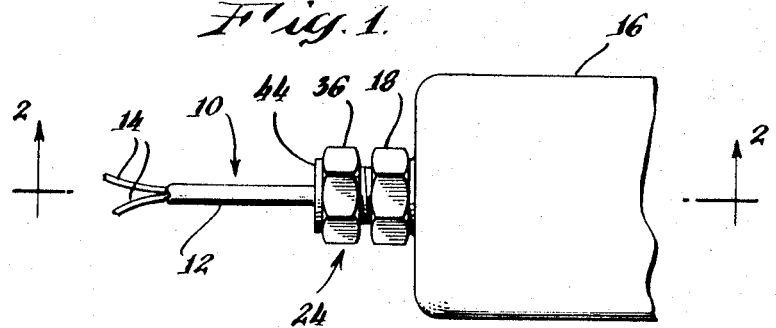
FIG. 1 is a front elevation view showing an MI cable connected to a junction box in accordance with the present invention.

Referring now to the drawings in greater detail, reference numeral 10 designates generally the end of an MI cable having a metal sheath 12 and a pair of conductors 14 extending therefrom.

The junction box 16 to which the cable 10 is to be sealed is formed with an outlet 18 internally threaded at 20, and having a peripheral shoulder 22 located at the base of the threads 20.

Figure 2:
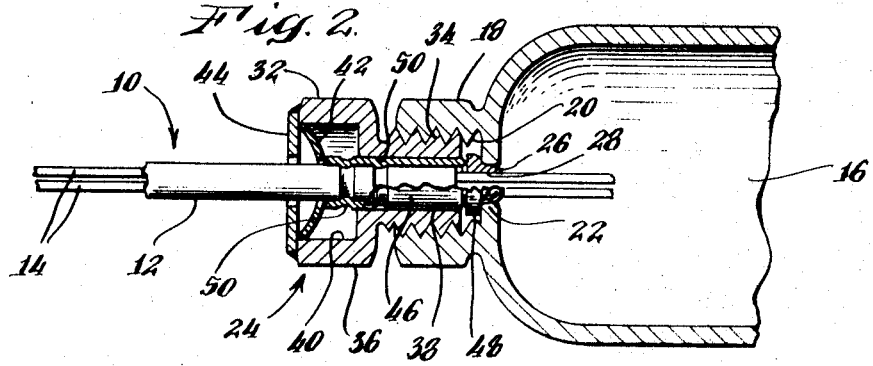
FIG. 2 is a longitudinal section view of the connection taken along the line 2—2 of FIG. 1.
Figure 3:
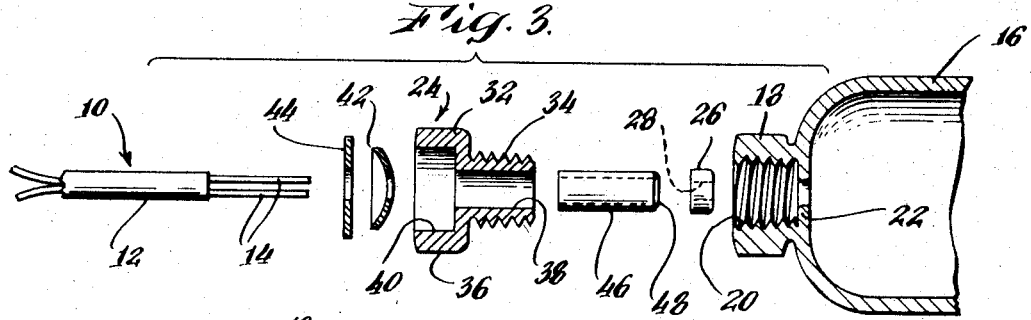
FIG. 3 is an exploded view of the parts comprising the connection of FIG. 1.

As shown in FIGS. 2 and 3, the connection designated generally by numeral 24 includes a compression seal in the form of a bushing or grommet 26 having apertures 28 to permit the conductors 14 to extend therethrough. The bushing 26 may be formed of a generally soft malleable metal, such as lead, if the conductors are covered with insulation, or may be formed of rubber of similar resilient dielectric if the conductors are not insulated. Of course, optional dielectric sleeves 30 may be used to insulate the uninsulated conductors 14 so as to make possible the use of a conductive bushing or grommet 26 under all circumstances.

To form the compression seal, a compression nut 32 is provided with external threads 34 for engaging threads 20 of the junction box 16. Flat surfaces 36 are provided to aid in the rotation of the compression nut. A bore 38 is provided in the compression nut 32 to allow passage of the MI cable. The compression nut 32 is provided with a hollow compartment 40 to contain an apertured spring washer 42 which is retained in the compartment 40 by an apertured closure collar 44 brazed, welded, or otherwise secured to the end of the compression nut 32.

The cable 10 is held in position by means of a cylindrical cable sleeve 46 made of metal and adapted to be crimped to the metal sheath 12 of the MI cable. A circular tooth 48 is formed on one end of the sleeve 46 for engaging the grommet 26 securely.

Figure 4:
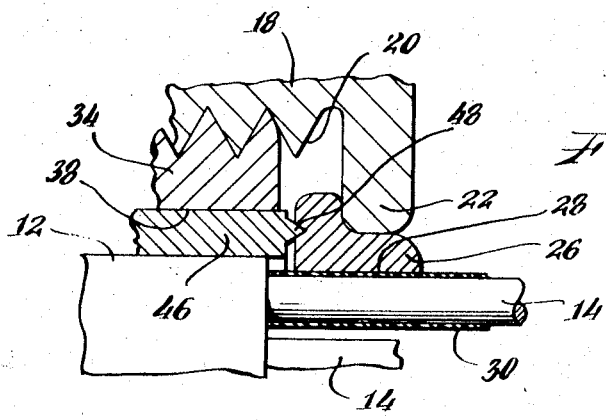
FIG. 4 is an enlarged portion of the sectional view of FIG. 2.

In forming the connection, a sufficient amount of metal sheath 12 is removed from the cable to permit the desired length of conductors 14 to extend into the junction box 16 for connection with a suitable utilization apparatus. The compression nut with the contained spring washer 42 is then drawn over the cable end followed by the cable sleeve 46. The sleeve is positioned with the toothed end thereof extending slightly past the cable sheath 12 as shown to best advantage in FIG. 4. Then the cable sleeve is crimped, as at 50, to the cable sheath 12, while conductors 14 are permitted to extend through apertures 28 in bushing 26 which is positioned in the outlet 18. Finally, the compression nut 32 is tightened to outlet 18 until the bushing 26 is deformed against shoulder 22 of outlet 18 and into engagement with conductors 14, forming an airtight seal. As the compression nut 32 is being tightened, the cable sleeve 46 causes tooth 48 to penetrate into bushing 26. The spring washer 42 which bears against sleeve 46, acts as a thrust bearing, facilitating relative rotation between the cable sleeve 46 and the compression nut 32 to eliminate unnecessary rotation of cable 10 while maintaining axial resilient pressure on the sleeve.

Cable sleeve 46 is preferably made of a malleable, corona-resistant metal, such as copper, aluminum, brass or equivalent alloys. The sealing bushing 26 is preferably made of relatively soft metal capable of flow under pressure or some relatively inert dielectric material capable of functioning in a manner similar to soft metal. Since soft metal may slowly creep and tend to loosen under high temperature changes, the provision of spring washer 42, which is loaded under the initial compression caused by tightening nut 32, insures that cable sleeve 46 will be maintained in sealing engagement with bushing 26.

The invention has thus been described, but it is desired to be understood that it is not confined to the particular form or usage shown and defined, the same being merely illustrative, and that the invention may be carried out in other ways without departing from the spirit of the invention; therefore, the right is broadly claimed to employ all equivalent instrumentalities coming within the scope of the appendant claims, and by means of which objects of this invention are attained and new results accomplished, as it is obvious that the particular embodiment herein shown and described is only one of the many that can be employed to obtain these objects and accomplish these results.

What is claimed is:
1. A terminal device for connecting sheathed insulated cable having extending conductors at one end, to a junction box having a threaded extending outlet and a shoulder at the base of said outlet, said terminal device comprising:
   a cable sleeve attachable to the sheath of a cable in telescopic coaxial relationship;
   a compression member disposed coaxially about said cable sleeve and being threaded to engage the threads of an extending outlet on a junction box;
   said cable sleeve having one end portion thereof engaged in coupled relationship with said compression member;
   resilient means disposed within said compression member coupling said compression member to said one end portion of said cable sleeve; and
   a deformable sealing member engaging the opposite end of said cable sleeve remote from the said one end portion;
   whereby, upon threaded engagement of said compression member with an extending outlet on a junction box, said deformable sealing member will be urged into engagement with a shoulder at the base of such an outlet by said resilient means which couples said compression member to said cable sleeve.

2. The terminal device of claim 1 wherein said resilient means is a bowed spring washer aligned coaxially with said cable sleeve at said one end portion of said cable sleeve.

3. The terminal device of claim 2 wherein said compression member has external threads on one portion and includes an enlarged inner diameter portion for retention of said bowed spring washer.

References Cited
UNITED STATES PATENTS
2,397,290  3/1946  Rasmussen _____ 285—158
2,715,152  8/1955  Balzer _____ 174—59

FOREIGN PATENTS
954,235  4/1964  Great Britain.

LEWIS H. MYERS, *Primary Examiner.*

D. A. TONE, *Assistant Examiner.*

U.S. Cl. X.R.

285—158